United States Patent
Schneider et al.

(10) Patent No.: US 6,680,555 B1
(45) Date of Patent: Jan. 20, 2004

(54) ELECTROMAGNETIC HYSTERESIS UNIT

(75) Inventors: Rudolf Schneider, Meckenbeuren (DE); Stefan Unseld, Weissensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/856,728

(22) PCT Filed: Nov. 27, 1999

(86) PCT No.: PCT/EP99/09231

§ 371 (c)(1),
(2), (4) Date: May 24, 2001

(87) PCT Pub. No.: WO00/35067

PCT Pub. Date: Jun. 15, 2000

(30) Foreign Application Priority Data

Dec. 4, 1998 (DE) .......................... 198 56 224
Apr. 19, 1999 (DE) .......................... 199 17 667

(51) Int. Cl.$^7$ .......................... H02K 49/00; H02K 49/02
(52) U.S. Cl. .......................... 310/103; 310/104; 310/105
(58) Field of Search .................. 310/103, 104, 310/105, DIG. 2

(56) References Cited

U.S. PATENT DOCUMENTS

| | | | | |
|---|---|---|---|---|
| 2,465,983 A | * | 3/1949 | Winther | 310/105 |
| 3,034,744 A | * | 5/1962 | Bancroft | 310/93 |
| 3,974,408 A | * | 8/1976 | Fehr et al. | 310/103 |
| 4,713,567 A | * | 12/1987 | Fey et al. | 310/105 |
| 5,054,587 A | * | 10/1991 | Matsui et al. | 310/105 |

FOREIGN PATENT DOCUMENTS

| | | | | |
|---|---|---|---|---|
| DE | 1788064 | * | 9/1968 | H02K/49/04 |
| DE | 82356106 | * | 12/1982 | H02K/49/04 |
| DE | 82356106 | * | 5/1983 | H02K/49/04 |
| DE | 19619409 | * | 5/1996 | H02K/49/00 |

* cited by examiner

Primary Examiner—Thomas M. Dougherty
Assistant Examiner—Karen Beth Addison
(74) Attorney, Agent, or Firm—Davis & Bujold, P.L.L.C.

(57) ABSTRACT

The invention is based on an electromagnetic hysteresis unit (1, 23) with magnetic north pole (4) which are arranged to alternate with magnetic south pole (5) on a magnet body (2, 3) in a peripheral direction (15) about an axis of rotation (14) at a distance from the magnetic south poles (5). The magnet body (2, 3) comprises a magnet coil (6). A hysteresis ring (16) connected with a rotor (17) can be moved with a slight play in relation to the poles (4, 5). It is proposed that the peripheral surfaces of the north pole (4) and south pole (5) lie on the same circle and opposite the same peripheral surface of the hysteresis ring (16). Thereby is created a radial construction space for embedding the hysteresis ring (16) in the rotor (17) which consists of material of good heat conductivity and optionally for providing cooling ribs.

12 Claims, 4 Drawing Sheets

ELECTROMAGNETIC HYSTERESIS UNIT

FIELD OF THE INVENTION

The invention relates to an electromagnetic hysteresis unit.

BACKGROUND OF THE INVENTION

By electromagnetic hysteresis units will be understood hereinafter as hysteresis brakes and hysteresis clutches. The method of operation of the hysteresis units is based on a magnetic action force of poles that attract each other in the synchronous running and on a constant magnetic reversal of a magnetically, semi-hard material, namely, of a hysteresis ring in the slip operation.

Unlike eddy-current clutches and brakes in hysteresis units, which are based on a different physical principle, the transmissible torque is, to a great extent, independent of the slip rotational speed.

The best known design of such hysteresis units consists of a magnet body with one exciting coil each having an outer and inner pole ring with axially aligned superposed soft iron poles in the same number and spacing, wherein the outer poles are disposed offset in peripheral direction relative to the inner poles in the stationary state or during synchronous running by half a spacing and have an opposite polarization. In the radial intermediate space of the pole rings, the hysteresis ring can rotate as a thin-walled, bell-shaped part without contact.

When magnet coils are traversed by current, a substantially radially oriented magnetic field generates between the poles of opposite polarity. But the pole off-set produces an alternatively tangential reorientation of the magnetic flow in the hysteresis ring and thus a permanent reverse magnetization of all elementary magnets when the hysteresis ring rotates relative to the magnetic body. Therefrom results a torque which depends only on the exciter flow. It can be regulated and controlled by adequately changing the exciting current. Such hysteresis units are known as clutch, e.g. from U.S. Pat. No. 2,488,827. Here the hysteresis ring is disposed radially between two parts of a rotatable magnet body which parts are connected by a disc of non-magnetizable material.

From DE 197 05 290 A1 is further known a hysteresis brake in which a hysteresis ring surrounds a closed magnetic ring of permanent magnetic material whose surface facing the hysteresis ring is provided with a plurality of poles embedded on the periphery and having alternatively opposite polarity. The magnetic ring is segmentally radially magnetized through and connected with a soft iron magnet body. The hysteresis ring rotates in an annular air gap between the magnet ring and an adjusting ring with slight radial play relative to the magnetic ring. The transmissible torque can be adjusted by an axial displacement of the adjusting ring.

The hysteresis ring is, in general, made of a material having small wall thickness and connected with a rotating part. Opposite to this, the parts provided with a large mass, such as magnet coils, magnet body, etc., are connected with the housing. In the case of a hysteresis clutch, one part of the magnet body is formed by a rotor and a magnetic-flux guiding disc connected therewith which rotates with slight play relative to the magnet body.

Because of the air gap between the hysteresis ring and the pole rings, the torque is contactlessly transmitted. Brakes produce both a brake torque in slip operation and a retaining torque in stationary state so that the decelerated part can also be kept in a decelerated position. Hysteresis clutches transmit torques both in synchronous running during which the coupled parts have the same rotational speed and in slip operation during which the parts to be coupled still have rotational speed difference. The transmissible torques depend only on the current in the exciting coil and can be continuously adjusted up to an admissible maximum value based on the type.

The power loss resulting in the slip operation heats the thin-walled hysteresis ring very quickly. The heat can be removed only very deficiently, via the small material thickness of the hysteresis ring, to the adjoining parts in order to be eliminated therefrom by further heat conduction and convection. The admissible permanent slip power on one side and the briefly removable slip work on the other are thus very limited.

Such hysteresis units are used, among others, for traction regulation for the processing of drawn endless products like wire, cable, rope, sheets, paper, threads, etc. They are also used for brake torque regulating systems and for a load simulation such as for test stands, ergometers, etc.

The problem on which the invention is based is to improve in the slip operation the brief and also the permanent thermal load of a hysteresis unit.

SUMMARY OF THE INVENTION

According to the invention the peripheral surfaces of the north poles and south poles lie on the same circle, the center of which lies on the axis of rotation. They also lie opposite the same peripheral surface of the hysteresis ring. Thereby the hysteresis ring is able to rotate on one peripheral surface at short distance from the magnets while on the other peripheral surface it is embedded in a rotor made of material having good heat conductivity which can also have cooling devices such as in the form of cooling ribs. It is thus ensured that the heat accumulated be thoroughly removed and that great slip torques can be transmitted for a long time.

The hysteresis ring conveniently surrounds the north poles and the south poles so that it lies with the adjoining rotor parts on the outer periphery of the hysteresis unit. Thereby result, on one hand, large heat radiation surfaces and, on the other, the rotor generates in this area itself a great air movement which favors the convention. In the peripheral area of the rotor cooling ribs are conveniently disposed which can be aligned both axially and in peripheral direction and can be interrupted by slots.

In one development of the invention, the poles are formed by pole fingers which, departing from axial front walls of the magnet body, are fitted upon each other and have between them a larger distance than from the hysteresis ring so that the magnetic flux leads from a north pole to a south pole via the hysteresis ring. The pole fingers can here advantageously overlap in peripheral direction.

The pole fingers, which extend substantially axially, taper toward their free end in axial direction and/or in peripheral direction. Thereby material and weight are spared and a good magnetic flux obtained. In particular, the tapering in peripheral direction produces a very uniform distribution of the magnetic flux between adjacent pole fingers so that the hysteresis ring uniformly absorbs energy on its breadth and local temperature peaks are prevented.

The magnet body can be easily produced with its pole fingers when it is divided in a radial plane, each separate part of the magnet body receiving the pole finger of one polarity.

A centering ring reciprocally centers the two parts of the magnet body which are usually interconnected with screws,.

To keep the rotating masses small, it is advantageous that the magnet body with the magnet coil be disposed fastened on the housing and to use a free space between the pole fingers for current supply. In combination with a pot-shaped rotor open on one side, current can be supplied without an expensive sliding ring arrangement subject to wear.

To increase the stability of the pole fingers, the same as to prevent vibrations and flow noises, it is convenient that the pole fingers be interconnected by a non-magnetizable material. If the material, preferably brass, has good heat conductivity, it can, at the same time, serve uniformly to distribute the accumulated heat and remove it to the outside. The material can be advantageously introduced as filling composition in the intermediate spaces between the pole fingers or be formed by a connecting ring upon which the pole fingers are shrunk.

When the hysteresis unit is designed as clutch, an outer part of the first magnet body is conveniently separated by an annular gap and connected with the second magnetic body via the non-magnetizable material. The rest of the first magnet body with the coil are mounted fastened on the housing while the second magnet body sits on a part to be coupled and is rotatably supported with a small gap relative to the first magnet body. A second part to be coupled is non-rotatably connected with the hysteresis unit which carries the hysteresis ring.

BRIEF DESCRIPTION OF THE DRAWING(S)

Other advantages result from the description of the drawing that follows. An embodiment of the invention is shown in the drawing. The expert will conveniently regard the features also separately and make with them logical added combinations. In the drawing.

DETAILED DESCRIPTION OF THE INVENTION

Figure 1:
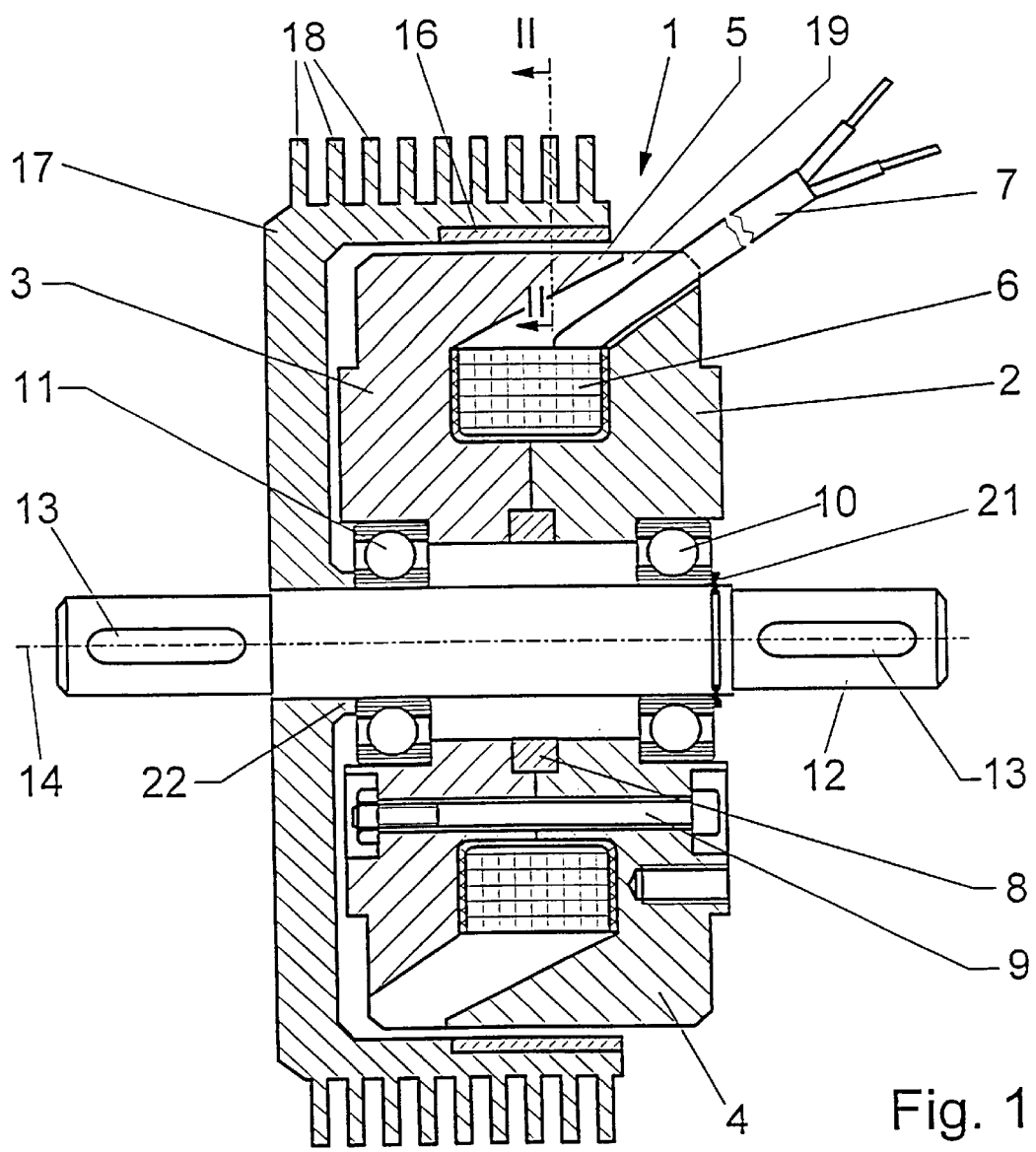
FIG. 1 is a longitudinal section through a hysteresis brake.

The hysteresis unit shown is a hysteresis brake 1. It has a divided magnet body 2, 3 which comprises one magnet coil 6. The magnet body is divided in a radial plane. The two parts 2 and 3 thereof are centered relative each other by a centering ring 8 and interconnected by screws 9. The magnet body 2, 3 consists of soft iron and has on its outer periphery pole fingers 4, 5 which extend substantially axially and are alternatively integrated on the part 2 or part 3 of the magnet body.

If the magnet coil 6 is supplied with current, via a current supply 7, the pole finger 4 form, in the embodiment shown, a north pole on part 2 of the magnet body while the pole finger 5 form south poles on part 3 of the magnet body. The magnet body 2, 3 is mounted fastened to the housing. Thereby the current supply 7 can be easily shifted through one of the free spaces 19 formed between the pole fingers 4, 5.

In the magnet body 2, 3 is supported, by ball bearings 10, 11, a shaft 12 which rotates around an axis of rotation 14. The shaft 12 carries on its ends fitting keys 13 by which rotating parts (not shown in detail) can transmit a torque to the shaft 12. On the shaft 12 sits firmly on a pot-shaped rotor 17 open on one side in which is embedded a hysteresis ring 16 made of magnetically semi-hard material. The shaft 12 is axially fixed between a collar 22 on the rotor 17 and a guard ring 21 embedded in the shaft 12. The rotor 17 itself is made of material having good heat conductivity and can support cooling devices in the form of cooling webs 18 in order to improve the heat conduction and convection. The cooling webs 18 can extend in peripheral direction or axially and have notches and/or bores.

Figure 2:
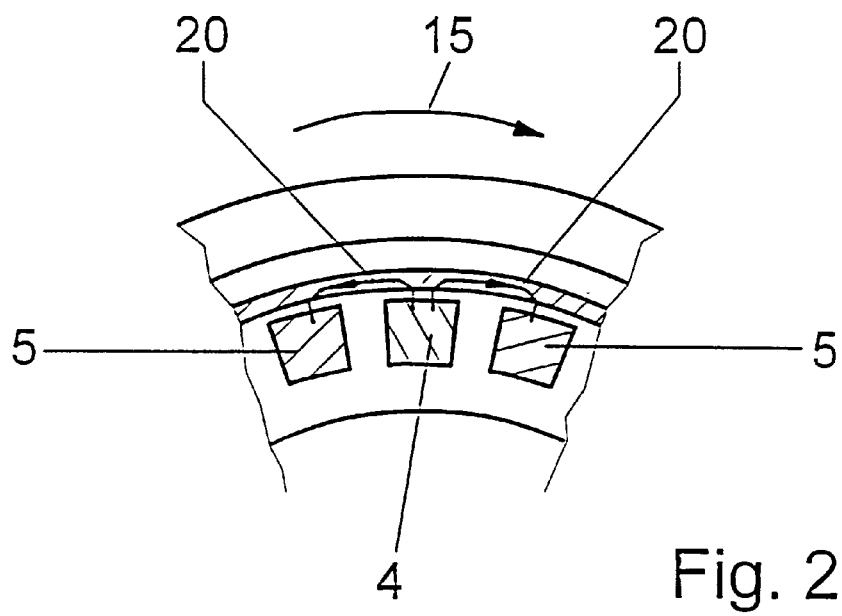
FIG. 2 is a section corresponding to the line II—II in FIG. 1.
Figure 3:
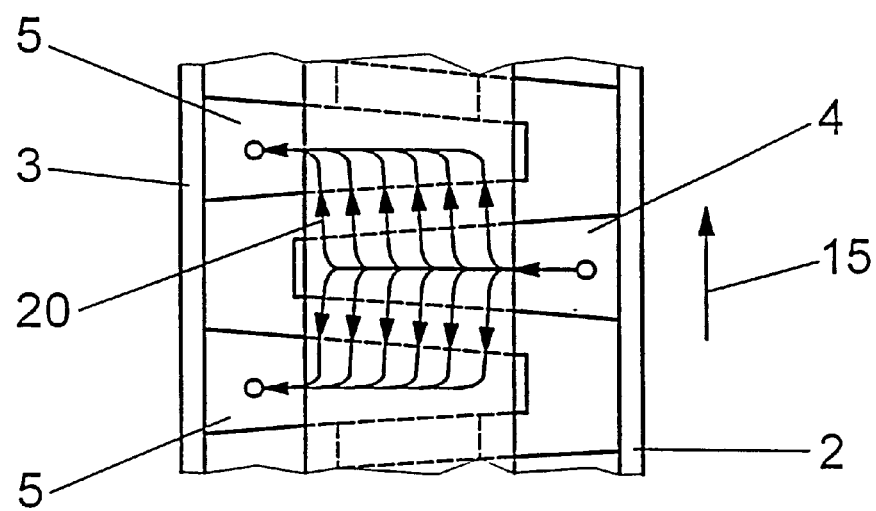
FIG. 3 is a partial development of a hysteresis ring and a few pole fingers according to FIG. 1.

FIG. 2 shows that the distance between the pole fingers 4, 5 is greater than the distance between the pole fingers 4,5 and the hysteresis ring 16. Thereby the hysteresis ring 16 is flowed through according to the magnetic flux 20. During a relative movement of the hysteresis ring 16 in peripheral direction 15 toward the magnet body 2, 3, the polarization of the elementary magnetic zones produced in the hysteresis ring 16 is reverse whereby a considerable torque can be transmitted. The torque primarily depends on the intensity of the current flowing through the magnet coil 6. As a result of the power loss in the slip operation which results from the reversal of polarization of the hysteresis ring 16, a great amount of heat accumulates in it. The amount of heat is, of course, removed via the rotor 17 and given off to the environment so that in comparison to known hysteresis units great torques can be transmitted in the slip operation without an overheating of the hysteresis brake having to be feared.

Figure 4:
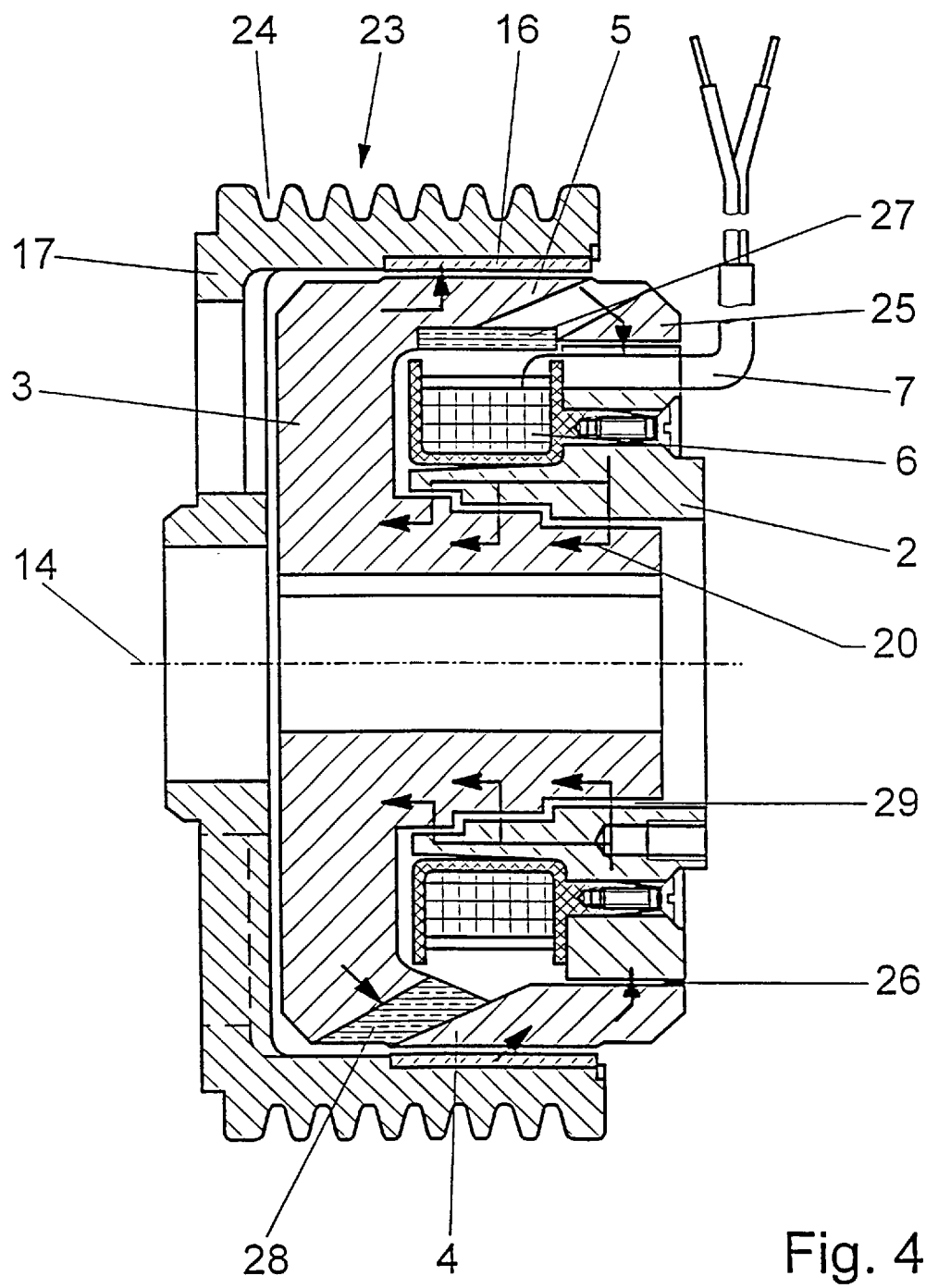
FIG. 4 is a longitudinal section through a hysteresis clutch wherein the upper half shows a design with connecting ring and the lower half a design with a filling compound.
Figure 5:
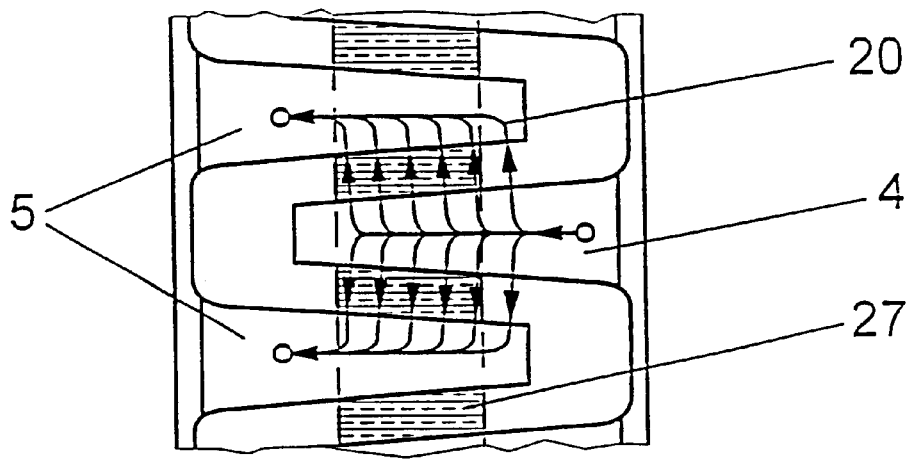
FIG. 5 is a partial development of a hysteresis ring and a few pole fingers according to FIG. 4, upper half.

According to FIG. 4, the hysteresis unit 23 is a clutch. It differs from the hysteresis unit 1 of FIG. 1 designed as a brake by the fact that the first magnet body 2, which is mounted fastened on the housing, has an outer part 25 which is separated by a narrow annular gap 26 from the other first magnet body 2. The outer part 25 is connected via a connecting ring 27 made of non-magnetizable material, preferably brass, with the second magnet body 3 by it being shrunk by its pole finger 4 and the second magnet body 3 by its pole finger 5 upon the connecting ring 27 (upper halves of FIG. 4 and FIG. 5). The connecting ring 27, which can also be used in a hysteresis unit 1 according to FIG. 1, imparts to the hysteresis unit 23 a great stability and serves at the same time for better distribution and removal of heat.

The second magnet body 3 sits upon a part to be coupled and is rotatably supported relative to the first magnet body 2 from which it is separated by an annular gap 26 and by a gap 29. The other part to be coupled is non-rotatably connected with rotor 17 in which the hysteresis ring 16 is embedded. The rotor 17 has on the outer periphery grooves 24 to enlarge the surface and thereby better to remove the heat. At the same time, the periphery of rotor 17 can be designed as belt pulley for a drive mechanism.

Figure 6:
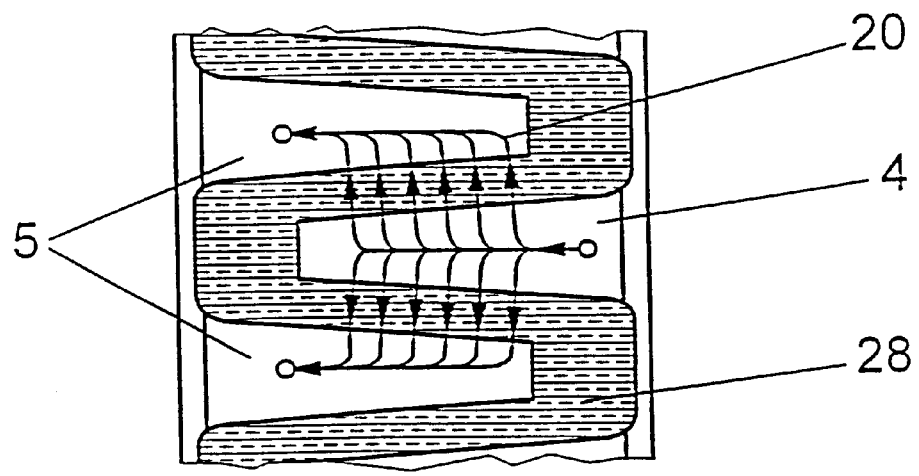
FIG. 6 is a partial development of a hysteresis ring and a few pole fingers according to FIG. 4, lower half.

In the variant according to the lower half of FIG. 4 and according to FIG. 6, the intermediate spaces between the pole fingers 4, 5 are filled with a non-magnetizable filling compound 28 which creates the connection between the outer part 25 of the first magnet body 2 and the second magnet body 3. The filling compound 28 is conveniently introduced in the intermediate spaces by a casting or sealing technique. As filling compound can be used, for example, a non-magnetizable metal like brass or also a plastic material.

Reference Numerals
1 hysteresis unit
2 first magnet body
3 second magnet body
4 pole finger, north pole
5 pole finger, south pole
6 magnet coil
7 current supply
8 centering ring
9 screw
10 ball bearing
11 ball bearing
12 shaft
13 fitting key
14 axis of rotation
15 peripheral direction
16 hysteresis ring
17 rotor
18 cooling webs
19 free space
20 magnetic flux
21 guard ring
22 collar
23 hysteresis
24 grove
25 outer part
26 annular gap
27 connecting ring
28 filling compound
29 gap

We claim:

1. A hysteresis unit (1, 23) comprising a magnetic north pole (4) around an axis of rotation (14), alternating at a distance in a peripheral direction (15) from a south pole (5) situated in a magnet body (2, 3) having a magnet coil (6), a movable hysteresis ring (16) having a slight play relative to said poles (4, 5) is connected with a rotor (17), and peripheral surfaces of the north pole (4) and south pole (5) lie on the same circle and opposite to an adjacent peripheral surface of said hysteresis ring (16), the moveable hysteresis ring (10) surrounds said north pole (4) and said south pole (6), said poles being formed by pole fingers (4, 5) which, departing from axial front walls of said magnet body (2, 3) are aligned upon each other and are spaced from each other a greater distance than from said hysteresis ring (16) and said hysteresis ring (16) abuts by a peripheral surface on said rotor (17), and wherein said pole fingers (4, 5) are interconnected by a non-magnetizable material.

2. The hysteresis unit (1, 23) according to claim 1, wherein said non-magnetizable material is preferably brass, which has good heat conductivity.

3. The hysteresis unit (1, 23) according to claim 1, wherein said pole fingers (4, 5) are supported by and shrunk upon a connecting ring (27).

4. The hysteresis unit (1) according to claim 1, wherein intermediate spaces between said pole fingers (4, 5) are filled with a non-magnetizable filling component (28).

5. The hysteresis unit (1, 23) according to claim 1, wherein it Is designed as a clutch by an outer part (25) with said pole finger (5) of said magnet body (2) being separated from the latter by a thin annular gap (26) and said second magnet body (3) sitting with a small gap (29) rotatably relative to said magnet body (2) upon a rotatable part to be coupled while the first magnet body (2) is mounted fastened on a housing.

6. An electromagnetic hysteresis unit (1, 23) comprising:
a magnet body (2, 3) having a magnet coil and multiple magnetic north poles (4) arranged alternatively (15) with multiple magnetic south poles (5) spaced an a tangential distance from each other around an axis of rotation (14) with peripheral surfaces of the north poles (4) and south poles (5) lie on the same circle;
a movable hysteresis ring (16) having slight play relative to said magnetic north and south poles (4, 5) and is connected to a rotor (17), said hysteresis ring (16) surrounds said north poles (4) and said south poles (5), said poles are formed by pole fingers (4, 6) which extend from axial facing surfaces of said magnet body (2, 3) and are directed towards each other having a greater distance from each other than from said hysteresis ring (16) and said hysteresis ring (16) abuts a peripheral surface on said rotor (17); and
wherein said rotor (17) consists of a material having good heat conductivity in order to improve the heat conduction, that said magnet body (2, 3) is constructed in two parts and divided in the area of the magnet coil (6) that said rotor (17) is firmly mounted on a shaft (12) that is supported in said magnet body (2, 3) by means of two ball bearings (10, 11), a collar (22) of said rotor (17) and a guard ring (21) mounted on said shaft (12) forming axial stops on which abuts a respective inner ring of one of said ball bearings (10, 11) while outer rings of said ball bearings abut on axial stops each formed by one of said two parts of said magnet body (2, 3) and that said magnet body is thick walled, the pole fingers being integral in the two parts of said magnet body and being tapered to their free end in axial direction relative to their radial and tangential extension and being tapered to a point relative to their radial expansion.

7. The hysteresis unit (1, 23) according to claim 6, wherein said rotor (17) has cooling devices (18).

8. The hysteresis unit (1, 23) according to claim 6, wherein said pole fingers (4, 5) overlap in peripheral direction (15).

9. The hysteresis unit (1, 23) according to claim 6, wherein said magnet body (2) Is fastened to a housing and the current supply for supplying electric current to the magnetic coil (7) is shifted through a free space (19) formed between said pole fingers (4, 5), said rotor being pot-shaped and defining an opening on one side.

10. An electromagnetic hysteresis unit (1, 23) comprising:
a magnet body (2, 3) constructed by a first part and a second part having a magnet coil (6) positioned between the first and second parts to induce a north pole in the first part and a south pole in the second part;
a plurality of first pole fingers having the electromagnetically induced north pole extending from a first axial face of the first part of the magnet body being electromagnetically circumferentially arranged with a plurality of second pole fingers having the electromagnetically induced south pole extending from a second axial face of the second part of the magnet body;
a shaft supporting the first and second parts of the magnet body (2,3) via a respective first and second bearings enabling relative rotational movement between the shaft and the magnet body;
a rotor (17) fixed to the shaft substantially surrounds the first and second parts of the magnet body, the rotor (17) having an inner peripheral face supporting a movable hysteresis ring (16) having a slight spacing relative to an outer peripheral face of the magnet body defined by the alternately circumferentially arranged first and second pole fingers of said first and second parts of the magnet body;

the alternately circumferentially arranged first and second pole fingers (4, 5) which extend from respective axial faces of said magnet body (2, 3) are aligned at an equal radial distance from the hysteresis ring and are interlaced towards each other and spaced from a respective adjacent pole finger a greater distance than the slight spacing from said hysteresis ring (16); and wherein the magnet body (2, 3) is radially divided by the magnet coil (6) and both the first and second parts being centered relative to each other and interconnected via a centering ring (8).

collar (22) portion of said rotor (17) abuts with an inner ring of the first bearing (10) to form a first axial stop, and a guard ring (21) mounted on said shaft (12) abuts an inner ring of the second bearing (11) while outer rings of said first and second bearings abut on axial stops each formed by said respective first and second parts of the magnet body (2, 3).

11. The electromagnetic hysteresis unit (1, 23) as set forth in claim 10 wherein the first and second pole fingers are integrally connected by a base portion to the respective first and second pass of said magnet body and axially and radially taper to a free end edge which is narrower than the base portion.

12. The electromagnetic hysteresis unit (1, 23) as set forth in claim 10 wherein the first and second parts of the magnet body (2, 3) are secured together by an axially aligned bolt spaced a radial distance from the axis and extending through the first and second parts of the magnet body.

* * * * *